United States Patent
Hoshino et al.

(10) Patent No.: US 7,053,551 B2
(45) Date of Patent: May 30, 2006

(54) ZINC SILICATE SYSTEM PHOSPHOR, METHOD FOR PRODUCING THE SAME, ZINC SILICATE SYSTEM PHOSPHOR PASTE, AND DISPLAY DEVICE

(75) Inventors: Hideki Hoshino, Hino (JP); Satoshi Ito, Hino (JP); Naoko Furusawa, Hino (JP); Hisatake Okada, Hino (JP)

(73) Assignee: Konica Corporation, Tokyo (JP)

( * ) Notice: Subject to any disclaimer, the term of this patent is extended or adjusted under 35 U.S.C. 154(b) by 344 days.

(21) Appl. No.: 10/648,539

(22) Filed: Aug. 25, 2003

(65) Prior Publication Data

US 2004/0075386 A1    Apr. 22, 2004

(30) Foreign Application Priority Data

Aug. 29, 2002  (JP) ............................. 2002-250453
Mar. 20, 2003  (JP) ............................. 2003-077862

(51) Int. Cl.
*H01J 11/02*  (2006.01)
*C09K 11/08*  (2006.01)

(52) U.S. Cl. .............................. 313/581; 252/301.6 R; 313/485; 313/468

(58) Field of Classification Search ................ 313/485, 313/468; 252/301.6 R
See application file for complete search history.

(56) References Cited

U.S. PATENT DOCUMENTS

| | | | | |
|---|---|---|---|---|
| 3,416,019 A | * | 12/1968 | Kaduk | .................... 313/486 |
| 4,336,313 A | * | 6/1982 | Peters et al. | ................ 428/691 |
| 4,925,703 A | * | 5/1990 | Kasenga et al. | ............ 427/215 |
| 5,196,234 A | * | 3/1993 | Taubner et al. | .............. 427/213 |

* cited by examiner

Primary Examiner—Ashok Patel
(74) Attorney, Agent, or Firm—Squire, Sanders & Dempsey L.L.P.

(57) ABSTRACT

At least one kind of a rear earth element or an alkaline earth metal element is activated together with manganese in a zinc silicate system phosphor, and a mean particle size of the phosphor is between 0.01 and 1.0 μm.

17 Claims, 2 Drawing Sheets

ZINC SILICATE SYSTEM PHOSPHOR, METHOD FOR PRODUCING THE SAME, ZINC SILICATE SYSTEM PHOSPHOR PASTE, AND DISPLAY DEVICE

BACKGROUND OF THE INVENTION

1. Field of the Invention

The present invention relates to a zinc silicate system phosphor, and further to a method for producing the zinc silicate system phosphor, to a zinc silicate-system phosphor paste, and to a display device such as plasma display panel or the like comprising a phosphor layer including the zinc silicate system phosphor.

2. Description of Related Art

Recently, a plasma display panel (hereinafter, referred to as "PDP") is capable of making a screen large and thin, and thereby, it attracts attention as a flat-panel display which can take the place of a cathode-ray tube (CRT). A PDP has two glass substrates comprising electrodes, and a number of micro discharge cells (hereinafter, referred to as "cells") formed by partition walls provided between the substrates. In the inner wall of a partition wall, a phosphor layer is provided, and a discharge gas using Xe or the like as principal component is charged therein. The cells are arranged regularly on the substrate. When voltage is applied between the electrodes and the cells are discharged selectively, ultraviolet rays due to the discharge gas are generated, and thereby, the phosphors are excited and emit a visible light.

Presently, as phosphors mainly used for a PDP, there are $(Y,Gd)BO_3$:Eu (Red), $Zn_2SiO_4$:Mn (Green), $BaMgAl_{10}O_{17}$:Eu (Blue) and the like. These phosphors are generally produced by a solid phase method, and their mean particle size is between 2 and 10 μm. The solid phase method is a method for obtaining a phosphor according to a solid phase reaction by mixing a predetermined amount of a compound including elements forming a ground material of the phosphor with a predetermined amount of a compound including activator elements such as Eu, Mn and the like, and calcining the mixture at a predetermined temperature.

Incidentally, with displays such as PDP and the like, improvement of brightness, smooth movie display and the like are required. Thereby, it is considered that improving the luminescence intensity of phosphors is effective in order to enhance the brightness. Particularly, a green phosphor has high visibility, so that it is important to enhance the luminescence intensity of the green phosphor in order to improve the white brightness. On the other hand, in order to achieve smooth movie display, information is required to be displayed in sequence per extremely short unit of time, so that phosphors having short persistence time are required.

The persistence time becomes short by increasing the amount of Mn in $Zn_2SiO_4$:Mn (Green). However, instead of that, the luminescent intensity deteriorates. $Zn_2SiO_4$:Mn has a structure such that a part of the Zn lattice points in the $Zn_2SiO_4$:Mn crystal is substituted for Mn, and the Mn becomes a luminescence center. However, the ionic radius of $Mn^{2+}$ (0.080 nm) is larger than the ionic radius of $Zn^{2+}$ (0.074 nm), and this causes lattice distortion or lattice defect in the crystal, which becomes a cause of deterioration of luminous efficiency.

Then, a method for decreasing lattice distortion or lattice defect caused in a crystal and improving the luminous efficiency by simultaneously substituting Mg having small ionic radius (the ionic radius of $Mg^{2+}$: 0.066 nm) when substituting Zn lattice points for Mn has been known (See "Journal of electrochemical society" 146(6) 2353–2356 (1999); hereinafter, referred to as "Non-Patent Document 1"). Furthermore, since the ionic radius of $Mg^{2+}$ is too small, the volume compensation effect of $Mg^{2+}$ is supplemented and the luminous efficiency is further improved by substituting $Ca^{2+}$ (the ionic radius: 0.099 nm) and $Sr^{2+}$ (the ionic radius: 0.116 nm) together (See Japanese Patent Laid-Open Publication No. 2002-249767; hereinafter, referred to as "Patent Document 1").

However, each phosphor in the above-described earlier technology (Patent Document 1 and Non-Patent Document 1) is produced by a solid phase method. No phosphors such that $Mg^{2+}$, $Ca^{2+}$ and the like are co-activated to $Zn_2SiO_4$:Mn as described above, according to a liquid phase method, and no methods of producing those phosphors is known.

Further, presently, along with miniaturization of the cell structure of a PDP, a phosphor having fine particles of not more than 1 μm is required. However, generally, with the solid phase method, in order to make fine particles of not more than 1 μm, it is required to perform crushing. Thereby, there is a possibility that lattice defect is generated in crystals according to stress applied at the time of crushing and the luminous efficiency deteriorates significantly. Furthermore, since the solid phase method is for producing phosphors according to solid-phase reaction, there remain nonreactive excessive impurities, excess soluble salts generated by reaction, and the like. Therefore, it is difficult to obtain a phosphor having high purity, and to control the content of activators in the ground material of crystals.

SUMMARY OF THE INVENTION

An object of the present invention is to provide a zinc silicate system phosphor of fine particles having large luminescence intensity and short persistence time, to a method for producing such a zinc silicate system phosphor, to a zinc silicate system phosphor paste, and to a display device such as plasma display panel or the like in which the zinc silicate system phosphor is used.

In order to achieve the above-described object, according to a first aspect of the present invention, the zinc silicate system phosphor of the present invention comprises: manganese activated in the phosphor; and at least one kind of element selected from rear earth elements and alkaline earth metal elements, the element being activated in the phosphor, wherein a mean particle size of the phosphor is between 0.01 and 1.0 μm.

According to the zinc silicate system phosphor of the present invention, it is possible to improve the luminescence intensity of the phosphor and to shorten the persistence time of the phosphor by activating at least one kind of element selected from rear earth elements and alkaline earth metal elements together with manganese.

Furthermore, the exciting lines such as ultraviolet rays and the like for exciting the phosphor proceed only to the surface portion of the particles of the phosphor. Therefore, by making the mean particle size between 0.01 and 1.0 μm, the ratio of the volume of the portion where the exciting lines proceed to the volume of the particles of the phosphor increases, compared to the phosphor having a mean particle size between 2 and 10 μm in earlier technology. Thereby, it is possible to receive and emit the exciting lines effectively, and to improve the luminescence intensity.

According to a second aspect of the present invention, the method for producing a zinc silicate system phosphor, comprises: a precursor forming step for forming a precursor by mixing a silicon system liquid material, in which a silicon system material is dispersed or dissolved in a liquid, with a solution including a zinc compound, a manganese compound and an element compound of at least one kind of element selected from rear earth elements and alkaline earth metal elements; and a calcining step for obtaining the phosphor having a mean particle size between 0.01 and 1.0 µm, in which manganese and at least one kind of the element selected from the rear earth elements and the alkaline earth metal elements are activated, by calcining the obtained precursor.

According to the method for producing the zinc silicate system phosphor of the present invention, since the precursor is formed by mixing the silicon system liquid material with the solution including a zinc compound, a manganese compound and an element compound of at least one kind of element selected from rear earth elements and alkaline earth metal elements, it is easy to control the ratio of composition of zinc, manganese, rear earth element or alkaline earth metal element. Therefore, in the zinc silicate system phosphor, it is easy to make the composition ratio of zinc, manganese, rear earth element or alkaline earth metal element into a suitable value such that the luminescence intensity becomes high and the persistence time becomes short.

Further, since the reaction efficiency becomes high as different from the solid phase synthetic method for performing solid phase reaction in earlier technology, no excessive impurities or excess soluble salts is generated, so that it is possible to form a precursor having high purity. Furthermore, when obtaining a phosphor having fine particles of 0.01 to 1.0 µm, there is no possibility that lattice defect, which is a cause of deterioration of luminescence efficiency, is generated in crystals of the phosphor since no treatments such as crushing or the like is required at the time of production.

Further, the phosphor in the first and second aspects of the present invention is preferable to be represented by the following formula (1):

$$Zn_\alpha SiO_4:Mn_x, M1_y, M2_z \quad (1)$$

wherein in the formula (1), the M1 and the M2 are a rear earth element or an alkaline earth metal element, respectively, and each range of the α, x, y and z is $1.4 \leq \alpha < 2.0$, $0 < x \leq 0.3$, $0 < y \leq 0.2$ and $0 \leq z \leq 0.2$. More preferably, the M1 is barium and the M2 is magnesium.

Accordingly, more preferable effects can be obtained in improving the luminescence intensity and shortening the persistence time by activating manganese and rear earth element or alkaline earth metal element at the above-described ratio.

Moreover, according to a third aspect of the present invention, the zinc silicate system phosphor paste of the present invention comprises: the phosphor in the above-described first or second aspect, which is dispersed in a mixture including a binder and an organic solvent. Here, the mixture may include a dispersant.

Further, according to a fourth aspect of the present invention, the display device of the present invention comprises: a phosphor layer containing the phosphor in the above-described first or second aspect, or a phosphor layer formed by applying or filling the phosphor paste in the above-described third aspect.

More preferably, the display device is a plasma display panel, and the plasma display panel comprises: two substrates arranged so as to face to each other by keeping a predetermined distance; partition walls for sectioning a space between the substrates in plurality, the partition walls being provided between the substrates; and a discharge cell formed by being surrounded with the partition walls and the substrates, wherein a phosphor layer containing the phosphor in the above-described first or second aspect, or a phosphor layer formed by applying or filling the phosphor paste in the above-described third aspect is preferable to be provided in an inner side of the discharge cell.

According to the display device of the present invention, since it comprises a phosphor layer containing the phosphor in the above-described first or second aspect, or a phosphor layer formed by applying or filling the phosphor paste in the above-described third aspect, the luminescence intensity of the phosphor layer becomes high and the persistence time of it becomes short. Thereby, the brightness of a display panel such as plasma display panel or the like improves, and moving images can be displayed smoothly.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Hereinafter, the embodiments of the zinc silicate system phosphor, the method for producing the zinc silicate system phosphor, and the plasma display panel (PDP) according to the present invention will be explained with reference to the drawings.

The zinc silicate system phosphor of the present invention is the phosphor in which manganese and at least one kind of element selected from rear earth elements and alkaline earth metal elements are activated, and which can be represented by the following formula (1):

$$Zn_\alpha SiO_4:Mn_x, M1_y, M2_z \quad (1)$$

wherein in the formula (1), the M1 and the M2 are a rear earth element or an alkaline earth metal element, respectively, and ranges of the α, x, y and z is $1.4 \leq \alpha < 2.0$, $0 < x \leq 0.3$, $0 < y \leq 0.2$ and $0 \leq z \leq 0.2$.

The zinc silicate-system phosphor according to the present invention may use one kind of element or two kinds of elements selected from rear earth elements and alkaline earth metal elements, as shown in the above-described formula (1).

As rear earth elements, any of Sc, Y, La, Ce, Pr, Nd, Pm, Sm, Eu, Gd, Tb, Dy, Ho, Er, Tm, Yb, Lu and the like can be used preferably. Particularly, when it is a green emitting phosphor, it is preferable to use cerium. It is also one of preferred modes to use two kinds of elements of cerium and europium.

As alkaline earth metal elements, any of Be, Mg, Ca, Sr, Ba, Ra and the like can be used preferably. Particularly, when it is a green emitting phosphor, magnesium and barium can be used preferably. Further, it is one of preferred modes to use two kind of elements of magnesium and barium, barium and calcium, magnesium and calcium, or the like.

In the present invention, the zinc content a shown in the above-described formula (1) is preferable to be $1.4 \leq \alpha < 2.0$ as described above, and more preferably, $1.5 \leq \alpha \leq 1.7$. When the zinc content a exceeds 2.0, desired effects cannot be obtained such that the persistence time becomes long or the like since distortion of crystal structure becomes large.

In the present invention, the activation amount x of manganese is preferable to be $0 < x \leq 0.3$ as described above, and more preferably, $0.03 \leq x \leq 0.2$. When the activation amount x exceeds 0.3, desired effects cannot be obtained such that the brightness deteriorates according to concentration quenching or the like.

Further, the activation amount y of M1 is preferable to be $0 < y \leq 0.2$. There is difference according to the used elements. However, for example, when magnesium is used as M1, its activated mount y is preferable to be $0.0005 \leq y \leq 0.05$. When the activation amount y exceeds 0.2, desired effects cannot be obtained. From the same reason, the activation amount z of M2 is preferable to be $0 \leq z \leq 0.2$, and is more preferable to be $0.0005 \leq z \leq 0.05$.

In addition, in the above-described formula (1), the zinc content $\alpha$ should be $\alpha = 2-x-y-z$ stoichiometrically. However, in the actually obtained phosphor, there are many cases that the zinc content $\alpha$ is shifted from the stoichiometric amount.

The mean particle size of the zinc silicate system phosphor of the present invention may be in a range of 0.01 to 1.0 μm, more preferably, in a range of 0.01 to 0.08 μm, further preferably, in a range of 0.01 to 0.05 μm, and most preferably, in a range of 0.01 to 0.03 μm.

When the particle is a so-called normal crystal such as cube or octahedron, the mean particle size is the length of the edge of the particle. Further, when the particle is not a normal crystal, for example, when it is spherical, rod-like or tabular, the mean particle size is the diameter when considering a sphere equal to the volume of the particle. In the present invention, the shape of the particles of the phosphor is not limited. However, a cube shape is preferable, furthermore, an octahedron shape is preferable, and a spherical shape is more preferred mode.

Further, as for the zinc silicate system phosphor of the present invention, the coefficient of variation of particle size distribution is preferable to be not more than 100%, further preferably, not more than 50%, and most preferably, not more than 30%. Here, the coefficient of variation of particle size distribution is the value defined as the following equation (2).

Coefficient of Variation of Particle Size Distribution (%)=(standard deviation of particle size/mean value of particle size)×100 (2)

Next, the method for producing the zinc silicate system phosphor according to the present invention will be explained.

In the method for producing the zinc silicate system phosphor of the present invention, a precursor forming step for forming a precursor by utilizing a liquid phase synthetic method and mixing the raw materials of the zinc silicate system phosphor in a liquid phase; and a calcining step for calcining the obtained precursor to obtain the zinc silicate system phosphor are performed.

In addition, the precursor is an intermediate product of the zinc silicate system phosphor, and is a compound which becomes to be a phosphor by calcining treatment as described above.

At first, the precursor forming step will be explained.

The liquid phase synthetic method referred in the present invention means the reaction methods in a liquid phase, such as coprecipitation method, reactive crystallization method, sol-gel method and the like.

In the liquid phase synthetic method, since the raw materials of a zinc silicate system phosphor are mixed in a liquid phase, it is easy to disperse the elements forming the zinc silicate system phosphor uniformly in the liquid phase. Therefore, it is also easy to control the composition ratio of each constituting element, so that a zinc silicate system phosphor having high luminescence intensity and short persistence time can be obtained by activating at least one kind of element selected from rear earth elements and alkaline earth metal elements together with manganese at an appropriate composition ratio.

Further, as different from the solid phase synthetic method for performing solid phase reaction in earlier technology, since the reaction is performed in the liquid phase among the elements forming a phosphor, no excessive impurities, excess soluble salts or the like is generated, so that a precursor having high purity can be formed. Furthermore, in case of obtaining a phosphor having fine particles of 0.01 to 1.0 μm, since no treatments such as crushing or the like is required at the time of producing, there is no possibility such that lattice defect, which becomes a cause of deterioration of luminescence intensity, occurs in crystals of a zinc silicate system phosphor.

In the present invention, any one of the coprecipitation method, reactive crystallization method, sol-gel method can be applied preferably. However, particularly, it is preferable to form a precursor according to the coprecipitation method by using the particles of silicon or a silicon compound such as silica or the like as center nuclei of the precursor. By forming a precursor in such a manner, a zinc silicate system phosphor having more excellent luminescence intensity and short persistence time can be obtained. Further, when forming a precursor according to the reactive crystallization method or the sol-gel method, it is preferable to form the precursor by dissolving a silicon compound such as sodium metasilicate, $Si(OC_2H_5)_4$ or the like into solvent such as water, ethanol or the like. Furthermore, from the viewpoint of obtaining a phosphor having finer particles and narrow particle size distribution, it is preferable to form the precursor under addition of the later-described protective colloid.

Next, the coprecipitation method will be explained. The coprecipitation method is a method of synthesizing a phosphor precursor by utilizing a coprecipitation phenomenon in a state of depositing the metallic elements or the like, which become activators, around the center nuclei of the phosphor precursor by mixing a solution including elements which become raw materials of the phosphor and further adding a precipitant. Here, the precipitation phenomenon means a phenomenon such that there is sufficient solubility in the situation when precipitation is caused from the solution, and that precipitation of ions which are not supposed to precipitate is accompanied. In production of a phosphor, it means the phenomenon such that the metallic elements and the like for forming an activator are deposited around the center nuclei of a phosphor precursor.

In the following, the method for producing a precursor of a zinc silicate system phosphor by utilizing the coprecipitation method and by using the particles of the silicon system material particles as center nuclei of a precursor (the method for producing a precursor of a phosphor according to the present invention) will be referred to as a "silica nuclei method".

In order to form a precursor according to the silica nuclei method, a silicon system liquid material in which a silicon system material is dispersed in a liquid is mixed with a material such that a metallic element is dissolved in a liquid in a positive ion state, or with a metal system liquid material in which a solid metallic element is dispersed in a liquid.

In the silica nuclei method, the silicon system material is preferable to be substantially insoluble in the later-described liquid, and is silicon (simple substance) or a compound including silicon.

As a compound including silicon, for example, silicon dioxide (silica) can be used preferably. As silicon dioxide, gas phase method silica, wet silica, colloidal silica and the like can be used. In detail, silica is roughly divided into two from viewpoint of producing method, one is gas phase method silica and the other is wet silica. The wet silica includes precipitation method silica, gel method silica, colloidal silica and the like. In the present invention, the colloidal silica is preferable. When using the colloidal silica, although it is not limited particularly, an anionic one is preferable. Further, the particle size is not more than 1 μm similarly to the above, preferably, not more than 0.5 μm, and more preferably, not more than 0.1 μm.

The BET specific surface area of the silicon system material of the present invention is preferable to be not less than 50 $m^2/g$, more preferably, not less than 100 $m^2/g$, and further preferably, not less than 200 $m^2/g$.

Here, the "BET specific surface area" is the specific surface area measured by the BET method. The specific surface area is the amount represented by total surface area of particles included in powders of a unit quantity. In this case, it is the total surface area of the particles of the silicon system material particles included in unit mass.

The BET method is a method generally used for measuring a specific surface area, and utilizes adsorption of gas. In this method, a molecule or ion whose size is known beforehand is adsorbed on a particle surface of a powder, and a surface area is calculated from the adsorbed amount by applying a BET isothermal adsorption process.

The primary particle size or the secondary agglomerated particle size of the particles of the silicon system material particles in the present invention is preferable to be not more than 1 μm, more preferably, not more than 0.5 μm, further preferably, not more than 0.1 μm, and most preferably, not more than 0.01 μm. The primary particle size or the secondary agglomerated particle size of the silicon system material is preferable to be not more than 0.1 μm since finer phosphor can be obtained. The mean particle size of the zinc silicate system phosphor after calcining can be made to a desired size by controlling the primary particle size or the secondary agglomerated particle size of the particles of the silicon system material particles.

In addition, the primary particle size is the particle size of a primary particle when using one crystallite as the primary particle. Further, the secondary agglomerated particle size is the particle size of a secondary agglomerated particle formed by agglomeration of primary particles of the silicon system material in liquid.

As the liquid for dispersing the silicon system material, it may be anything if it does not substantially dissolve the silicon system material. Water, alcohols or their mixture is preferable. As alcohols, it may be anything if it disperses the silicon system material. For example, methanol, ethanol, isopropanol, propanol, butanol and the like can be given. Among these, ethanol in which the silicon system material can be dispersed comparatively easily is preferable.

Here, "do not substantially dissolve the silicon system material" means that the solubility of the silicon system material to the liquid is in a range of not more than 0.1%.

In the present invention, it is preferable to prepare the silicon system liquid material beforehand. Here, to "prepare beforehand" means to prepare the dispersion state of the silicon system material in liquid or to prepare the secondary agglomerated particle size of the silicon system material beforehand so as to make it into a desired state.

As an example of preparing method, agitation can be given. When agitating, the secondary agglomerated particle size or the dispersion state of the silicon system material can be made in a desired state by combing the agitation speed and the agitation time to the silicon system liquid material. As more effective method, performing ultrasonic dispersion of the silicon system liquid material can be given.

Further, at the time of preparation, a surfactant or a dispersant may be added if required. Furthermore, the temperature of the silicon system liquid material when performing preparation is preferable to be not more than 50° C., preferably, not more than 30° C., and more preferably, not more than 10° C. from viewpoint of preventing viscosity rise according to re-agglomeration of the silicon system material.

In addition, when using the above-describe colloidal silica, since its particle size and dispersion state in liquid are prepared beforehand, a suitable one may be used appropriately.

As described above, the dispersion state of the silicon system material in liquid becomes well and the secondary agglomerated particle size and the like become constant by preparing the silicon system liquid material beforehand or by using the colloidal silica. Thereby, a zinc silicate system phosphor having fine particles in a range of 0.01 to 1.0 μm can be obtained in narrow size distribution.

Next, the solution including zinc compound, manganese compound and an element compound of at least one kind selected from rear earth element and alkaline earth metal element will be explained.

The zinc compound, manganese compound, rear earth compound and alkaline earth metal compound are compounds including zinc, manganese, rear earth and alkaline earth metal, respectively. They are compounds including elements (zinc, manganese, rear earth and alkaline earth metal) which forms a zinc silicate system phosphor together with the above-described silicon system material by calcining. These are preferable to be various compounds of chlorides, nitrates, sulfates or the like. Preferably, they are compounds which dissolve in solvent in a state of positive ion.

As the solvent for dissolving the above-described zinc compound, manganese compound, rear earth compound and alkaline earth metal compound, it may be anything if it does not substantially dissolve the silicon system material. However, water, alcohols or their mixture is preferable from the view of handling. As alcohols, methanol, ethanol, isopropanol, propanol, butanol and the like are given. Particularly, ethanol is preferable.

In the silica nuclei method according to the present invention, a solution including precipitant for forming a precipitate by reacting with one of zinc, manganese, rear earth and alkaline earth metal may be mixed when mixing the silicon system material with the solution including zinc compound, manganese compound and an element compound of at least one kind selected from rear earth element and alkaline earth metal element at predetermined ratio.

Here, the solution including a precipitant means an agent in which a precipitant shown in the following is dissolved in water, alcohols or their mixture. As alcohols, concretely, methanol, ethanol, isopropanol, propanol, butanol and the like can be given. It may be anything if it disperses the silicon system material.

As the precipitant, organic acid or alkali hydroxide can be used preferably. Organic acid or alkali hydroxide forms an organic salt or hydroxide as a precipitate by reacting with the metallic element. At that time, the precipitate of these is preferable to be deposited around the particles of the silicon system material that become center nuclei of the phosphor.

Further, the amount of the used precipitant is preferable to be not less than one time of the stoichiometric amount required to deposit the metallic element as a precipitate of organic salt, hydroxide or the like.

As organic acid, it is preferable to have a carboxylic acid function (—COOH). Concretely, oxalic acid, formic acid, acetic acid, tartaric acid and the like can be given. Further, it may be the one that generates oxalic acid, formic acid, acetic acid, tartaric acid or the like according to hydrolysis or the like.

As alkali hydroxide, it may be anything if it has hydroxyl group (—OH), generates hydroxyl group by reacting with water, or generating hydroxyl group by hydrolysis. For example, ammonia, sodium hydroxide, potassium hydroxide, urea and the like can be given. Among these, ammonia is used preferably, and particularly, ammonia not including alkali metal is used preferably.

Next, the reactive crystallization method and the sol-gel method will be explained.

The reactive crystallization method is a method for synthesizing a precursor by utilizing a crystallization phenomenon, which is by mixing a silicon system material which becomes a raw material of the precursor of a zinc silicate system phosphor with a solution including a metallic element except silicon. These are preferable to be chloride, nitrate, sulfate or the like. Further, it is preferable to dissolve these in a solvent in a state of positive ion. For example, sodium metasilicate can be used preferably as the silicon system material.

In addition, the crystallization phenomenon is a phenomenon such that a solid phase is deposited from a liquid phase when physical or chemical change of environment according to cooling, evaporation, pH regulation, concentration or the like, or when change in a state of the mixed system is caused by chemical reaction, or the like.

The method for producing a precursor according to the reactive crystallization method of the present invention means a producing method according to physical or chemical operation which can be exciting cause of the crystallization phenomenon described above.

The sol-gel method is generally a producing method by mixing a required amount of the silicon system material and the metallic element except silicon that become raw materials of the precursor as metalalkoxide, metallic complex, double alkoxide made by adding metal simple substance in their organic solvent solution, metal halide, metal salt of organic acid, metal simple substance and the like, and by performing thermal or chemical polycondensation. For example, as the silicon system material, $Si(OCH_3)_4$ in which silicon is used as metalalkoxide, or the like can be used.

Any solvent may be used if the reactive raw materials are dissolved when applying the above-described reactive crystallization method or sol-gel method. However, water is preferable from viewpoint of easiness of supersaturating control. Further, in case of the sol-gel method, a mixed solution of water and alcohols such as ethanol or the like is a preferable mode. The order of addition of the reactive raw materials to the solvent may be the same time or different time. A suitable order can be decided appropriately according to the activity.

Further, in case of forming a precursor by using the above-described reactive crystallization method or the sol-gel method, it is preferable to adjust various physical properties such as reaction temperature, addition rate, addition position, agitation conditions, pH and the like. It is also preferable to add protective colloid, surfactant or the like to control the mean particle size. It is also one of preferable modes to concentrate or age the liquid when addition of raw materials is completed, if required.

Particularly, it is preferable to add protective colloid since the particle size or agglomerated state of the phosphor particles can be controlled and the mean particle size of the phosphor particles after calcining can be made in a desired size in a range of 0.01 to 1.0 μm.

As such a protective colloid, various high-molecular compounds can be used regardless of natural or artificial, however, protein is particularly preferable. In this case, the mean molecular weight of protective colloid is preferable to be not less than 10,000, more preferably, between not less than 10,000 and not more than 300,000, and particularly, between not less than 10,000 and not more than 30,000 is preferable.

As protein, for example, gelatin, water-soluble protein, water-soluble glycoprotein and the like can be given. Concretely, albumin, ovalbumin, casein, soybean protein, synthesis protein, genetically-engineered protein and the like can be given. Among these, particularly, gelatin can be used preferably.

As gelatin, for example, lime-treated gelatin and acid-treated gelatin can be given. These may also be used together. Furthermore, hydrolyzate of these gelatins or enzyme decomposer of these gelatins may also be used.

Further, the above-described protective colloid is not required to be a single component. Various binders may be mixed in the protective colloid. Concretely, for example, a graft polymer of the above-described gelatins and other polymers can be used.

The protective colloid can be added in one or more raw material solutions. It may be added in all of the raw material solution. The precursor can be made sufficiently small by forming the precursor under the existence of a protective colloid to prevent the agglomeration of the precursor particles. Thereby, various properties of the phosphor can be improved such that the phosphor after calcining becomes finer particles, particle size distribution becomes narrow, luminescence property becomes well, and the like. In addition, in case of performing reaction under existence of the protective colloid, it is required to give sufficient consideration to control of the particle size distribution of the precursor or removal of impurities such as excess soluble salts or the like.

Even though it is the case of utilizing any liquid phase synthesis method of the above-described coprecipitation method, reactive crystallization method and sol-gel method, it is desirable to mix each liquid uniform in the precursor forming step. The mixing method of each liquid (for example, silicon system liquid material, metal system liquid material and the like) is not limited particularly. However, the mixing method according to agitation is preferable since the mixed state or the like is easily controlled and it is low cost. Further, as the mixing method, it may be any method such as batch type, continuous type, external circulation mixing and the like.

Dispersion of each ion which forms the zinc silicate system phosphor at the time of reaction becomes well by forming the precursor while mixing each liquid uniformly, so that a phosphor having uniform composition can be obtained.

Furthermore, in the precursor forming step, it is a preferred mode to prepare a mixer for forming precursor particles continuously in order to perform good particle growth aside from a reactor. In this case, it is preferable not to introduce the mixed liquor in the mixer into the reactor until the mixing temperature, the added liquid flow, pH at the time of mixing and the like becomes to a range set beforehand, and is preferable to supply the mixed liquor into the reactor when it reaches to a predetermined condition. For example, the passage of each of the mixer and the reactor, and the mixer and the outside of the reactor may be formed with a pipe, and a switch member for switching the mixed liquor may be provided so as to be sent to the reactor or the outside of the reactor. Good seed particles can be supplied to the reactor by controlling the switch member so that nuclei or fine particles of the precursor formed in the mixer in a transient state may not be supplied into the reactor. Thereby, particle growth can be performed sufficiently.

It is preferable to remove impurities such as excess soluble salts and the like from the precursor by performing desalting step after the precursor forming step is completed. As the desalting step, various membrane separation section, coagulation process, electrodialysis process, a method using ion-exchange resin, noodle wash, and the like can be applied.

After the desalting step is completed, the precursor is collected according to a method of filtration, evaporation to dryness, centrifugal separation or the like.

Thereafter, it is preferable to perform drying to the collected precursor. As a drying temperature, it is preferable to be in a range of 20° C. to 300° C., and further preferably, 90° C. to 200° C. As a method for drying directly, evaporation, spray-dry to dry while granulating, and the like can be given.

Next, the calcining step will be explained. The calcining of a precursor may be performed by any method. The calcining temperature and time may be adjusted appropriately. For example, a desired phosphor can be obtained by filling an alumina boat with the precursor and calcining it in predetermined gas atmosphere at a predetermined temperature. Further, when calcining a precursor of a green phosphor ($Zn_2SiO_4$:Mn or the like), calcining is preferable to be performed one or more times in a temperature range between 400° C. and 1400° C. in inert atmosphere and in a range of 0.5 to 40 hours. Moreover, it may be combined with air atmosphere (or oxygen atmosphere) and reducing atmosphere, if required. When combining with the reducing atmosphere, it is preferable to calcine at a temperature of not more than 800° C. in order to prevent evaporation of a metallic element such as zinc or the like from the crystal. As a method for obtaining the reducing atmosphere, a method of putting a block of graphite in a boat filled with a precursor, a method of calcining in nitrogen-hydrogen atmosphere or rare gas-hydrogen atmosphere, and the like can be given. Vapor may also be included in these atmospheres.

By calcining a precursor, the zinc silicate system phosphor is formed according to calcining reaction of the phosphor. At that time, an $SiO_2$ solid solution is formed in the inside of the zinc silicate system phosphor. It is estimated that the formation of the $SiO_2$ solid solution as described above may be a cause for obtaining good effects with respect to the after-image property of the obtained phosphor.

Treatments such as dispersing, washing, drying, sieving and the like may be performed to the obtained zinc silicate system phosphor after the calcining step is completed.

Figure 1:
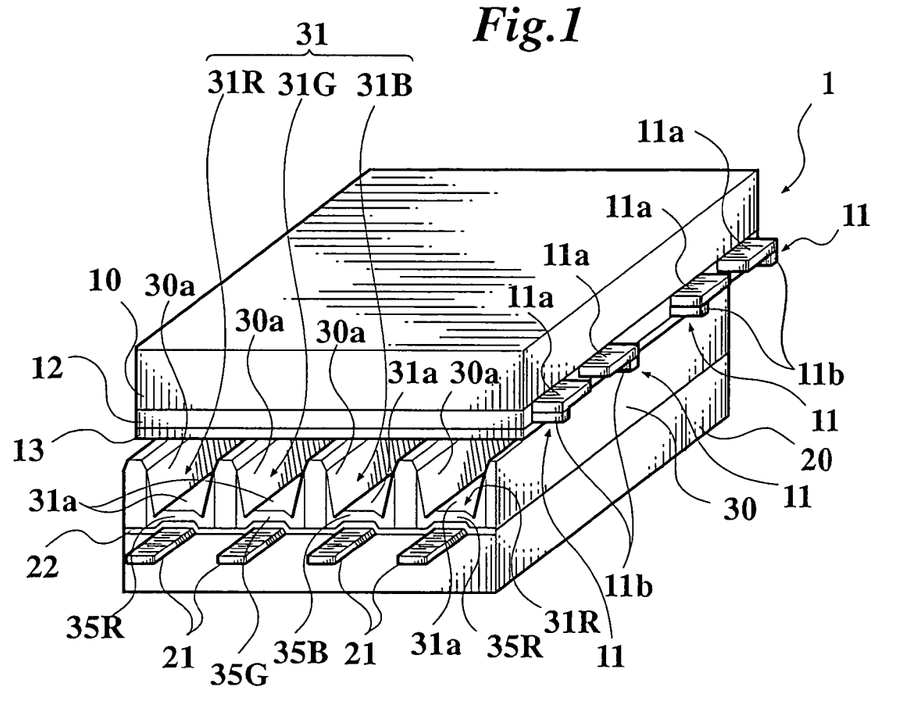
FIG. 1 is a schematic construction view showing an example of a plasma display panel as a display device according to the present invention.

Hereinafter, a plasma display panel as an example of a display device according to the present invention will be explained with reference to FIG. 1. In addition, the PDP is generally divided into a DC type for applying direct voltage and an AC type for applying alternating voltage from viewpoint of structure of electrodes and operation mode. In FIG. 1, the schematic arrangement of an example of an AC type PDP is shown.

The PDP 1 shown in FIG. 1 has two substrates 10 and 20 provided with electrodes 11 and 21; partition walls 30 provided between these substrates 10 and 20; a plurality of micro discharge cells (hereinafter, referred to as "discharge cells") 31 sectioned in a predetermined shape by the partition walls 30. The discharge cells 31 shown in FIG. 1 are the ones so-called stripe type such that the partition walls 30 are provided parallel per a predetermined distance (that is, in a stripe shape) when the substrates 10 and 20 are arranged horizontally.

Each discharge cell 31R, 31G and 31B is provided with a phosphor layer 35R, 35G and 35B comprising a phosphor which emits a light of red (R), green (G) or blue (B). Further, in the inner side of each discharge cell 31, discharge gas is charged, and at least one point such that the electrodes 11 and 21 are crossed in a planar view is provided.

The PDP 1 according to the present invention is the one that the above-described phosphor layer 35G is formed by using the zinc silicate system phosphor, which emits a green light, produced by the above-mentioned producing method according to the present invention.

Hereinafter, each structure of the PDP 1 will be explained.

At first, the structure of the front plate 10 arranged in the display side of the two substrates will be explained. The front plate 10 transmits a visible light emitted from the discharge cells 31, and is for displaying various kinds of information on the substrates. The front plate 10 functions as a display screen of the PDP-1.

As the front plate 10, a material, such as soda lime glass (blue plate glass) or the like, for transmitting a visible light can be used preferably. As for the thickness of the front plate 10, a range of 1 to 8 mm is preferable, and 2 mm is more preferable.

The front plate 10 is provided with display electrodes 11, a dielectric layer 12, a protective layer 13 and the like.

A plurality of display electrodes 11 are provided on a face of the front plate 10 that faces to the back plate 20, and are arranged regularly. Each of the display electrodes 11 comprises a transparent electrode 11a and a bus electrode 11b. It has a structure such that the bus electrode 11b similarly formed in a band-like shape is laminated on the transparent electrode 11a formed in a wide-width band-like shape. In addition, the width of the bus electrode 11b is formed narrower than that of the transparent electrode 11a. Further, the display electrodes 11 are orthogonal to the partition walls 30 in a planar view.

In addition, two display electrodes 11 arranged so as to face to each other in a predetermined discharge gap are used in a pair. By performing plasma discharge between this pair of display electrodes 11 and 11, visible lights can be generated from the phosphor layers 35R, 35G and 35B.

As a transparent electrode 11a, a transparent electrode such as nesa-coated film or the like can be used. Its sheet resistance is preferable to be not more than 100 Ω. As the width of the transparent electrode 11a, a range of 10 to 200 μm is preferable.

The bus electrode 11b is for lowering the resistance. It can be formed by sputtering or the like of Cr/Cu/Cr. As the width of the bus electrode 11b, a range of 5 to 50 μm is preferable.

The dielectric layer 12 covers the whole surface of the front plate 10 where the display electrodes 11 are disposed. The dielectric layer 12 can be formed from a dielectric material such as low-melting glass or the like. As the thickness of the dielectric layer 12, a range of 20 to 30 μm is preferable.

The surface of the above-described dielectric layer 12 is wholly covered with the protective layer 13. As for the protective layer 13, an MgO film can be used. As the thickness of the protective layer 13, a range of 0.5 to 50 μm is preferable.

Next, the structure of the back plate 20 side, which is the other substrate of the two substrates 10 and 20, will be explained.

The back plate 20 is provided with address electrodes 22, a dielectric layer 22, partition walls 30, phosphor layers 35R, 35G and 35B, and the like.

As the back plate 20, similar to the front plate 10, a soda lime glass (blue plate glass) or the like can be used. As the thickness of the back plate 20, a range of 1 to 8 mm is preferable, and about 2 mm is more preferable.

A plurality of the above-described address electrodes 21 are provided on the face of the back plate 20 that faces to the front plate 10. The address electrodes 21 are also formed in a band-like shape as well as the transparent electrode 11a and the bus electrode 11b. A plurality of address electrodes 21 are provided per a predetermined distance so as to be orthogonal to the display electrodes 11 in a planar view.

As an address electrode 21, a metal electrode such as Ag thick film electrode or the like can be used. The width of the address electrodes 21 is preferable to be in a range of 100 to 200 μm.

The dielectric layer 22 covers the whole surface of the back plate 20 where the address electrodes 21 are provided. The dielectric layer 22 can be formed from a dielectric material such as low-melting glass or the like. As the thickness of the dielectric layer 22, a range of 20 to 30 μm is preferable.

On the above-described dielectric layer 22, the partition walls 30 are provided so as to protrude from the back plate 20 side to the front plate 10 side. The partition walls 30 are formed so as to be long and are provided on the both sides of each address electrode 21 to form the discharge cells 31 in stripe in a planar view as described above.

The partition walls 30 can be formed from a dielectric material such as low-melting glass or the like. The width of the partition walls 30 is preferable to be from 10 to 500 μm, and about 100 μm is more preferable. As the height (thickness) of the partition walls 30 is generally in a range of 10 to 100 μm, and about 50 μm is preferable.

Each discharge cell 31 is provided with one of the phosphor layers 35R, 35G and 35B emitting each color of lights as mentioned above, in a regular order.

The phosphor layer 35G among each phosphor layers 35R, 35G and 35B, which emits a green light, is preferable to comprise the zinc silicate system according to the present invention represented with the above-mentioned formula (1).

The mean particle size is preferable to be in a range of 0.01 to 1.0 μm, more-preferably, in a range of 0.01 to 0.8 μm, and further preferably, in a range of 0.01 to 0.3 μm.

The phosphors forming the phosphor layers 35R and 35B that emit a red or blue light are not limited particularly. However, as for the phosphor for being used in the phosphor layer 35R which emits a red light, for example, the one whose composition formula is represented with $(Y,Gd)BO_3$:Eu can be used preferably. Further, as for the phosphor for being used in the phosphor layer 35B which emits a blue light, for example, the one whose composition formula is represented with $BaMgAl_{10}O_{17}$:Eu can be used preferably. Further, the mean particle size of these phosphors is preferable to be in a range of 0.1 to 3.0 μm, and more preferably, in a range of 0.1 to 1.0 μm.

Further, the thickness of the above-described phosphor layers 35R, 35G and 35B is not limited particularly, however, it is preferable to be in a range of about 5 to 50 μm.

When forming the phosphor layer 35G, a phosphor paste in which the zinc silicate system phosphor produced in the above is dispersed in a mixture of binder, solvent, dispersant and the like and which is prepared in an appropriate viscosity is applied to or filled in the discharge cell 31. Thereafter, the phosphor layer 35G such that the zinc silicate system phosphor is attached to the side face 30a and the bottom face 31a of the partition wall is formed by drying or calcining the phosphor paste. The content of the zinc silicate system phosphor in the phosphor paste is preferable to be in a range of 1 mass % to 60 mass %.

As binder suitable for dispersing the particles of the zinc silicate system phosphor well, ethyl cellulose or polyethylene oxide (polymer of ethylene oxide) is given. Particularly, ethyl cellulose whose content of ethoxy group ($-OC_2H_5$) is between 49% and 54% is preferable to be used. Further, it is possible to use a photosensitive resin as a binder. The content of the binder is preferable to be between 0.15 mass % and 10 mass %. In addition, in order to adjust the shape of the phosphor paste to be applied between the partition walls, the content of the binder is preferable to be set more within a range that the viscosity of the paste is not too high.

As the solvent, it is preferable to use the one that an organic solvent having hydroxy group (OH group). As concrete examples of the organic solvent, terpineol ($C_{10}H_{18}O$), butyl carbitol acetate, pentanediol (2,2,4-trimethyl pentanediol monoisobutylate), dipentene (Dipentene, also known as Limonen), butyl carbitol and the like are given. The mixed solvent in which these organic solvents are mixed has excellent solubility for dissolving the above-described binder. Thereby, dispersibility of the phosphor paste becomes well, so that it is preferable.

In order to improve dispersion stability of the particles of the phosphor in the phosphor paste, it is preferable to add a surfactant as a dispersant. The content of the surfactant in the phosphor paste is preferable to be between 0.05 mass % and 0.3 mass % from the viewpoint of effectively obtaining effect of improving the dispersion stability, the later-described charge removing effect or the like.

As concrete examples of the surfactant, (a) anionic surfactants, (b) cationic surfactants and (c) nonionic surfactants can be used. Each of them includes concretely the followings.

(a) As anionic surfactants, fatty acid salts, alkyl sulfates, ester salts, alkyl benzene sulfonates, alkyl sulfo succinates, naphthalenesulfonic acid polycarboxylic acid polymers and the like are given.

(b) As cationic surfactants, alkylamines, quaternary ammonium salts, alkylbetaine, amine oxides and the like are given.

(c) As nonionic surfactants, polyoxyethylene alkylethers, polyoxiethylene derivatives, sorbitan fatty acid esters, glycerin fatty acid esters, polyoxyethylene alkylamines and the like are given.

Furthermore, it is preferable to add a charge-removing substance in the phosphor paste. The above-described surfactants generally have a charge-removing function for preventing charging, and many of them correspond to charge-removing substances. However, since the charge-removing function differs according to the kinds of phosphors, binders and solvents, it is preferable to perform tests to various kinds of surfactants, and to select the one showing good results.

As charge-removing substances, besides surfactants, fine particles comprising an electroconductive material can be given. As electroconductive fine particles, carbon impalpable powders including carbon black, impalpable powders of graphite, impalpable powders of metal such as Al, Fe, Mg, Si, Cu, Sn and Ag and impalpable powders including these metal oxides can be given. The addition amount of such electroconductive fine particles is preferable to be in a range of 0.05 mass % to 1.0 mass % in response to the phosphor paste.

By adding a charge-removing substance in the phosphor paste, for example, imperfect formation of the phosphor layer, such as rising of the phosphor layer in cut lines of address electrodes in the center portion of a panel, generation of a little variation in the amount of the phosphor paste to be applied in cells or in a attached state, or the like can be prevented according to the charging of the phosphor paste. Therefore, a homogeneous phosphor layer can be formed in every cell.

In addition, when surfactants or carbon impalpable powders are used as charge-removing substances as described above, since the charge-removing substances are evaporated or burnt down in the phosphor calcining step for removing the solvent or binder included in the phosphor paste, the charge-removing substances do not remain in the phosphor layer after calcining. Therefore, there is no possibility such that some trouble is caused in driving (luminescence operation) of a PDP according to remanence of charge-removing substance in the phosphor layer.

When dispersing the zinc silicate system phosphor in the above-described various mixtures, for example, an impeller type disperser of high speed agitation type, the one for performing atomization by both impact (crush) and shear force when making medium media such as colloid mill, roller mill, ball mill, vibratory ball mill, attritor mill, planet ball mill, sand mill or the like move in an apparatus, dry type disperser such as cutter mill, hammer mill, jet mill or the like, ultrasonic wave disperser, high pressure homogenizer, or the like can be used.

When applying or filling the phosphor paste prepared as above to the discharge cell 31, it can be performed according to various methods such as screen printing method, photoresist film method, ink jet method and the like.

Particularly, the ink jet method is preferable since the phosphor paste can be applied to or filled in between the partition walls 30 at low cost, easily, precisely and uniformly even though the pitch of the partition walls 30 are narrow and the discharge cells 31 are formed finely. In the present invention, since the mean particle size of particles of the zinc silicate system phosphor is between 0.01 and 1 µm, clogging or imperfect discharging of nozzle, precipitation of particles of the phosphor can be suppressed even though the ink jet method is applied, so that a thin phosphor layer can be formed precisely and uniformly.

As for the display according to the present invention, such as PDP 1 or the like, the brightness improves by using the green phosphor shown as the above-mentioned formula (1) obtained by the producing method of the present invention, and the display can display moving images smoothly. Particularly, the luminescence intensity of the green phosphor having high visibility improves and the persistence time becomes short, so that the white brightness improves and after-image according to afterglow, flickering of images or the like can be prevented.

Further, since the mean particle size of the zinc silicate system phosphor of the present invention is small, the phosphor can be filled in the phosphor layer 35G effectively. Thereby, the phosphor layer 35G can be formed thinly, and the discharge cell can be made wide. Furthermore, the ultraviolet rays for exciting the phosphor proceed only to the surface layer portion of the particles of the phosphor. Therefore, compared with the phosphor whose mean particle size is between 2 and 10 µm, which is produced according to the solid phase synthetic method or the like in earlier technology, the percentage of the volume in the portion to which the ultraviolet rays proceed to the volume of the particles of the phosphor increases, so that the phosphor can receive the ultraviolet rays and emit lights effectively.

EXAMPLES

Example 1

In Example 1, phosphors 1-1 to 1-12 were produced under various conditions, and the luminescence intensity and the persistence time of the obtained phosphors were evaluated. At first, the production of the phosphors 1-1 to 1-12 will be explained.

(1) Production of Phosphor 1-1

Liquid A was prepared by adding 15 g of gelatin (mean molecular weight of 20,000) into pure water so that the total would be 300 g. Next, liquid B was prepared by dissolving 42.39 g of zinc nitrate hexahydrate, 2.15 g of manganese nitrate hexahydrate and 0.38 g of magnesium nitrate hexahydrate in pure water so as to be 150 g. Further, 150 g of liquid C was prepared by dissolving 9.15 g of sodium metasilicate ($Na_2SiO_3$) in pure water.

Next, the liquid B and liquid C were added simultaneously into the liquid A according to double jet at an addition rate of 10 cc/min by using roller pumps while agitating the liquid A. At that time, aqueous ammonia was added appropriately so that the pH in the liquid A would become 10. After the liquid B and liquid C were added, the mixed liquid was agitated for a few minutes (that is, the time that the reaction promotes sufficiently), and thereafter the reacted material was washed sufficiently by using pure water while performing solid-liquid separation according to suction filtration. Then, drying at 100° C. was performed for 12 hours, and a dried precursor was obtained. The obtained precursor was calcined in 100% nitrogen atmosphere at 1200° C. for 3 hours, and a phosphor 1-1 was obtained.

(2) Production of Phosphor 1-2

A phosphor 1-2 was produced in the same manner as the above-described (1) except that the addition amount of gelatin was made to be 30 g and the rate when adding the liquid B and liquid C into the liquid A was made to be 40 cc/min.

(3) Production of Phosphor 1-3

Liquid A was prepared by adding aqueous ammonia into a mixed solution of pure water:ethanol=2:1 so as to control the liquid A to pH 10. Next, 150 g of liquid B was prepared by dissolving 15.59 g of Si(OC$_2$H$_5$)$_4$ and 2.15 g of manganese nitrate hexahydrate in the pure water:ethanol=2:1 mixed solution. Then, 150 g of liquid C was prepared by dissolving 42.39 g of zinc nitrate hexahydrate and 0.38 g of magnesium nitrate hexahydrate in pure water.

Next, the liquid B was added into the liquid A at an addition rate of 10 cc/min by using a roller pump while agitating the liquid A. Thereafter, it was heated to 60° C., and the liquid C was added into the liquid A at an addition rate of 50 cc/min. After the liquid C was added, the mixed liquid was agitated for a few minutes, and thereafter, the reacted material was washed sufficiently by using pure water while performing solid-liquid separation according to suction filtration. Then, drying at 100° C. was performed for 12 hours, and a dried precursor was obtained. The obtained precursor was calcined in 100% nitrogen atmosphere at 1200° C. for 3 hours, and a phosphor 1-3 was obtained.

(5) Production of Phosphor 1-4

Liquid A was prepared by mixing 4.50 g of silicon dioxide (AEROSIL 200 produced by Nippon Aerosil Co., Ltd., BET specific surface area of 200 m$^2$/g) with pure water so as to be 300 g. Next, liquid B was prepared by dissolving 42.39 g of zinc nitrate hexahydrate, 2.15 g of manganese nitrate hexahydrate and 0.38 g of magnesium nitrate hexahydrate in pure water so as to be 150 g. Furthermore, 150 g liquid C was prepared by mixing 21.90 g of aqueous ammonia (28%) with pure water.

Next, the liquid B and the liquid C were added simultaneously according to double jet in the surface of the liquid A at an addition rate of 10 cc/min by using roller pumps while agitating the liquid A. After the liquid B and the liquid C were added, the mixed liquid was agitated for a few minutes, and thereafter, the reacted material was washed sufficiently by using pure water while performing solid-liquid separation according to suction filtration. Then, drying was performed at 100° C. for 12 hours, and a dried precursor was obtained. Then, the obtained precursor was calcined in 100% nitrogen atmosphere at 1200° C. for 3 hours, and a phosphor 1-4 was obtained.

(5) Production of Phosphor 1-5

A phosphor 1-5 was obtained in the same manner as the phosphor 1-4 in the above-described (4) except that the liquid A was prepared by mixing 15.02 g of colloidal silica (KLEBOSOL30R25 produced by Clariant KK, 30 wt %) with pure water so as to be 300 g.

(6) Production of Phosphor 1-6

A phosphor 1-6 was obtained in the same manner as the phosphor 1-5 in the above-described (5) except that the liquid B was prepared by dissolving 36.21 g of zinc nitrate hexahydrate, 2.15 g of manganese nitrate hexahydrate and 0.38 g of magnesium nitrate hexahydrate in pure water so as to be 150 g.

(7) Production of Phosphor 1-7

A phosphor 1-7 was obtained in the same manner as the phosphor 1-5 in the above-described (5) except that the liquid B was prepared by dissolving 36.21 g of zinc nitrate hexahydrate, 2.15 g of manganese nitrate hexahydrate, 0.38 g of magnesium nitrate hexahydrate and 0.01 g of calcium nitrate hexahydrate in pure water so as to be 150 g.

(7) Production of Phosphor 1-7

A phosphor 1-7 was obtained in the same manner as the phosphor 1-5 in the above-described (5) except that the liquid B was prepared by dissolving 36.21 g of zinc nitrate hexahydrate, 2.15 g of manganese nitrate hexahydrate, 0.38 g of magnesium nitrate hexahydrate and 0.01 g of calcium nitrate tetrahydrate in pure water so as to be 150 g.

(8) Production of Phosphor 1-8

A phosphor 1-8 was obtained in the same manner as the phosphor 1-5 in the above-described (5) except that the liquid B was prepared by dissolving 34.87 g of zinc sulfate heptahydrate, 1.81 g of manganese sulfate pentahydrate and 0.53 g of cerium sulfate octahydrate in pure water so as to be 150 g.

(9) Production of Phosphor 1-9

A phosphor 1-9 was obtained in the same manner as the phosphor 1-5 in the above-described (5) except that the liquid B was prepared by dissolving 34.87 g of zinc sulfate heptahydrate, 1.81 g of manganese sulfate pentahydrate, 0.53 g of cerium sulfate octahydrate and 0.3575 g of magnesium sulfate pentahydrate in pure water so as to be 150 g.

(10) Production of Phosphor 1-10

A phosphor 1-10 was obtained in the same manner as the phosphor 1-5 in the above-described (5) except that the liquid B was prepared by dissolving 34.87 g of zinc sulfate heptahydrate, 1.81 g of manganese sulfate pentahydrate and 0.0196 g of barium sulfate in pure water so as to be 150 g.

(11) Production of Phosphor 1-11

A phosphor 1-11 was obtained in the same manner as the phosphor 1-5 in the above-described (5) except that the liquid B was prepared by dissolving 34.87 g of zinc sulfate heptahydrate, 1.81 g of manganese sulfate pentahydrate, 0.0196 g of barium sulfate and 0.3575 g of magnesium sulfate heptahydrate in pure water so as to be 150 g.

(12) Production of Phosphor 1-12

Figure 2:
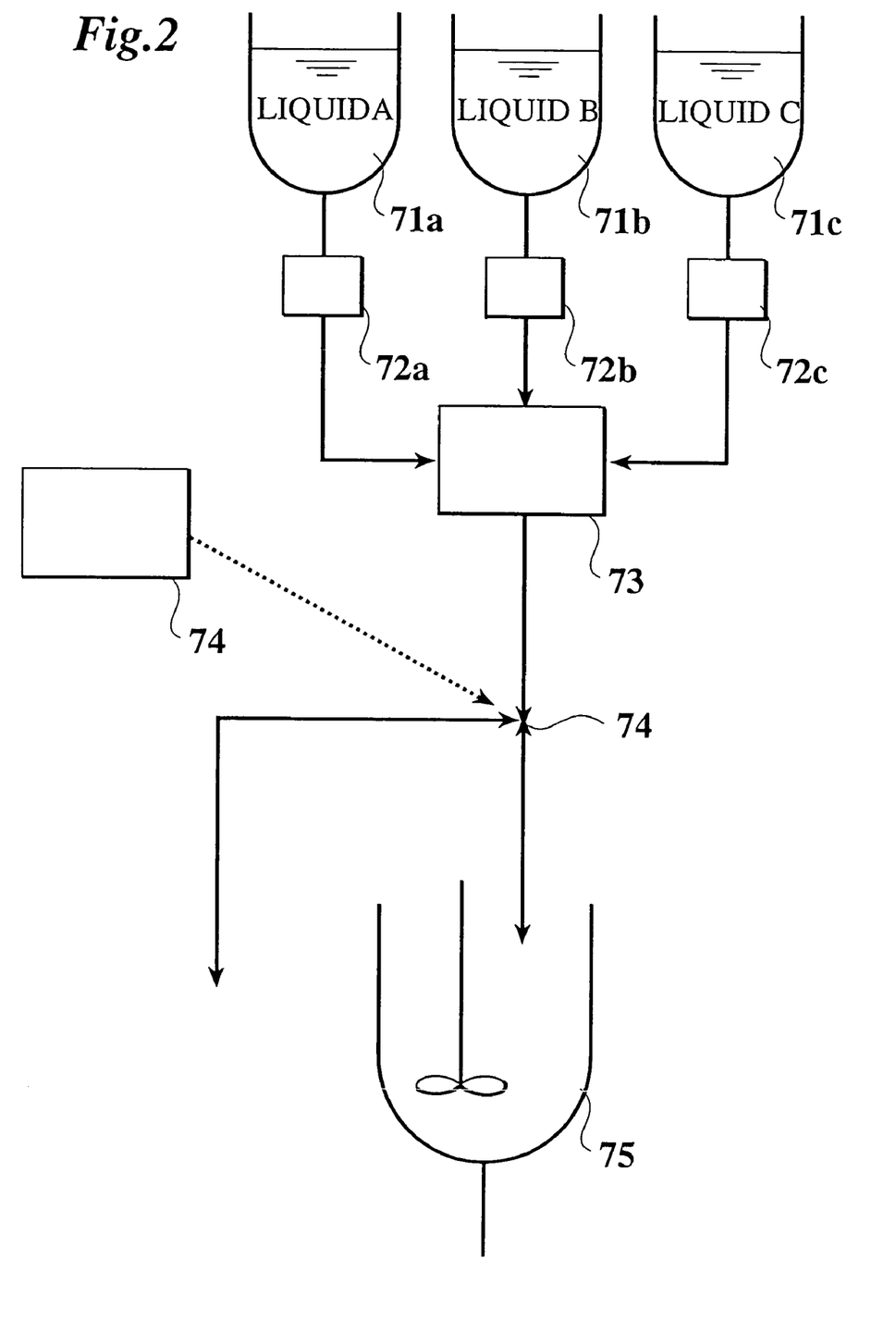
FIG. 2 is a schematic view showing a reactor used when producing a phosphor 1-12 of Example 1.

A phosphor 1-12 was obtained in the same manner as the phosphor 1-11 in the above-described (11) except that the liquid A, liquid B and liquid C were charged in raw material liquid kettles 71a, 71b and 71c shown in FIG. 2, and that the liquid A, liquid B and liquid C were supplied in a mixer 73 through flow controllers 72a, 72b and 72c, respectively, so as to be supplied at a predetermined addition rate and were sent out to the outside of a reactor 75 by a switch section 74 until they become to a mixed state set beforehand (mixing temperature, addition liquid rate and pH at the time of mixing) in the mixer 73.

Comparative Example 1

Next, the method for producing phosphors used as Comparative Examples will be explained.

(1) Production of Comparative Example 1-1

As a raw material, a mixture was prepared by combining 10.45 g of zinc oxide (ZnO) with 4.50 g of silicon dioxide. Next, 0.67 g of manganese carbonate (MnCO$_3$) and 1.02 g of magnesium carbonate (MgCO$_3$) were added to the mixture, and a phosphor was obtained by calcining them in 100% nitrogen atmosphere at 1200° C. for 3 hours after mixing them in a ball mill. The obtained phosphor was classified, and the one that mean particle size was 3.2 μm was made to be Comparative Example 1-1.

(2) Production of Comparative Example 1-2

At first, the one in which only 300 g of pure water was weighed was used as liquid A. Next, liquid B was prepared by dissolving 42.39 g of zinc nitrate hexahydrate and 2.15 g of manganese nitrate hexahydrate in pure water so as to be 150 g. Then, 150 g of liquid C was prepared by dissolving 9.15 g of sodium metasilicate in pure water.

Next, the liquid B and the liquid C were added simultaneously according to double jet in the liquid A at an addition rate of 10 cc/min by using roller pumps while agitating the liquid A. After the liquid B and the liquid C were added, the mixed liquid was agitated for a few minutes, and thereafter, the reacted material was washed sufficiently by using pure water while performing solid-liquid separation according to suction filtration. Then, drying was performed at 100° C. for 12 hours, and a dried precursor was obtained. Then, the obtained precursor was calcined in 100% nitrogen atmosphere at 1200° C. for 3 hours, and a phosphor was obtained. This was made to be Comparative Example 1-2.

(3) Production of Comparative Example 1-3

A phosphor was produced in the same manner as the phosphor 1-1 in the above-described (1) of the Example 1 except that the liquid B was prepared by dissolving 42.39 g of zinc nitrate hexahydrate and 2.15 g of manganese nitrate hexahydrate in pure water so as to be 150 g, and this was made to be Comparative Example 1-3.

[Evaluation 1]

1. Composition of Phosphor

The composition ratios of the phosphors 1-1 to 1-12 and the Comparative Examples 1-1 to 1-3 obtained in the above were analyzed according to a spectroscopy of inductively coupled plasma atomic emission (SPS4000 produced by Seiko Instruments Inc.). Each composition ratio is shown in Table 1.

TABLE 1

| PHOSPHOR | COMPOSITION FORMULA $(Zn_\alpha SiO_4:Mn_x, M1_y, M2_z)$ | COMPOSITION RATIO | | | |
|---|---|---|---|---|---|
| | | Zn $\alpha$ | Mn x | M1 y | M2 z |
| 1-1 | $Zn_\alpha SiO_4:Mn_x, Mg_y$ | 1.86 | 0.08 | 0.015 | — |
| 1-2 | $Zn_\alpha SiO_4:Mn_x, Mg_y$ | 1.85 | 0.08 | 0.016 | — |
| 1-3 | $Zn_\alpha SiO_4:Mn_x, Mg_y$ | 1.84 | 0.07 | 0.014 | — |
| 1-4 | $Zn_\alpha SiO_4:Mn_x, Mg_y$ | 1.86 | 0.08 | 0.017 | — |
| 1-5 | $Zn_\alpha SiO_4:Mn_x, Mg_y$ | 1.86 | 0.08 | 0.018 | — |
| 1-6 | $Zn_\alpha SiO_4:Mn_x, Mg_y$ | 1.56 | 0.07 | 0.016 | — |
| 1-7 | $Zn_\alpha SiO_4:Mn_x, Mg_y, Ca_z$ | 1.54 | 0.07 | 0.017 | 0.0005 |
| 1-8 | $Zn_\alpha SiO_4:Mn_x, Ce_y$ | 1.53 | 0.08 | 0.008 | — |
| 1-9 | $Zn_\alpha SiO_4:Mn_x, Mg_y, Ce_z$ | 1.55 | 0.07 | 0.017 | 0.007 |
| 1-10 | $Zn_\alpha SiO_4:Mn_x, Ba_y$ | 1.55 | 0.08 | 0.0009 | — |
| 1-11 | $Zn_\alpha SiO_4:Mn_x, Mg_y, Ba_z$ | 1.55 | 0.08 | 0.017 | 0.0009 |
| 1-12 | $Zn_\alpha SiO_4:Mn_x, Mg_y, Ba_z$ | 1.54 | 0.08 | 0.016 | 0.0009 |
| COMPARATIVE EXAMPLE 1-1 | $Zn_\alpha SiO_4:Mn_x, Mg_y$ | 1.84 | 0.07 | 0.017 | — |
| COMPARATIVE EXAMPLE 1-2 | $Zn_\alpha SiO_4:Mn_x$ | 1.86 | 0.08 | — | — |
| COMPARATIVE EXAMPLE 1-3 | $Zn_\alpha SiO_4:Mn_x$ | 1.85 | 0.08 | — | — |

According to Table 1, as for the phosphors 1-1 to 1-12, it was realized that each composition ratio show difference values in the mole fraction of prescribed value of each raw material and in the analyzed value which was obtained actually. It is considered this is due to the addition rate of each raw material liquid, reaction conditions at the time of forming precursors, such as pH in the mixed liquor and the like, volatilization caused at the time of calcining, and the like.

2. Mean Particle Size and Luminescence Intensity (1) Measurement of Mean Particle Size With respect to the phosphors 1-1 to 1-12 and the phosphors of the Comparative Examples 1-1 to 1-3 obtained in the above, 1000 particles of the phosphors photographed by using a scanning electron microscope (SEM) were selected randomly, and each mean particle size was calculated.

(2) Evaluation of Luminescence Intensity

Next, ultraviolet rays were irradiated to the phosphors 1-1 to 1-12 and the phosphors of the Comparative Examples 1-1 to 1-3, respectively, in a vacuum chamber of 0.1 to 1.5 Pa by using an excimer 146 nm lamp (produced by Ushio INC.), and green lights were emitted from the phosphors. Next, the intensity of each of the obtained green lights was measured by using a detector (MCPD-3000 (produced by Otsuka Electronics Co., Ltd.)). Then, the peak intensity of emission was calculated with a relative value by using the phosphor obtained in the Comparative Example 1-1 as 100. The obtained results are shown in Table 2 together with mean particle size.

TABLE 2

| PHOSPHOR | MEAN PARTICLE SIZE (μm) | RELATIVE LUMINESCENCE INTENSITY |
|---|---|---|
| 1-1 | 0.79 | 104 |
| 1-2 | 0.56 | 107 |
| 1-3 | 0.45 | 108 |
| 1-4 | 0.43 | 109 |
| 1-5 | 0.39 | 113 |
| 1-6 | 0.37 | 117 |
| 1-7 | 0.39 | 122 |
| 1-8 | 0.39 | 119 |
| 1-9 | 0.39 | 120 |
| 1-10 | 0.38 | 119 |
| 1-11 | 0.38 | 125 |
| 1-12 | 0.15 | 129 |
| COMPARATIVE EXAMPLE 1-1 | 3.2 | 100 |
| COMPARATIVE EXAMPLE 1-2 | 2.6 | 92 |
| COMPARATIVE EXAMPLE 1-3 | 0.83 | 96 |

In Table 2, high values were obtained in the phosphors 1-1 to 1-12 of the present invention compared with the Comparative Examples 1-1 to 1-3. That is, extremely high values compared with the Comparative Examples 1-2 and 1-3 were obtained by activating a small amount of alkaline earth metal element or rear earth element to $Zn_2SiO_4$ together with Mn even though the precursors were formed according to the same liquid phase method. Furthermore, compared with the Comparative Example 1-1 produced according to the solid liquid method, a phosphor further excellent in luminescence intensity can be obtained by activating a small amount of alkaline earth metal element or rear earth element to $Zn_2SiO_4$ together with Mn according to the liquid phase method.

3. Evaluation of Persistence Time

Next, the persistence times of the phosphors 1-1 to 1-12 and the Comparative Examples 1-1 to 1-3 were measured by using fluorescence lifetime spectrometers. The persistence time was made to be the time such that the luminescent intensity after shielding exciting lights becomes 1/10 of the luminescence intensity just before the shielding, and was shown in a relative value by using the phosphor obtained in the Comparative Example 1-1 as 100. Each relative persistence time is shown in Table 3 together with mean particle size.

TABLE 3

| PHOSPHOR | MEAN PARTICLE SIZE (μm) | RELATIVE PERSISTENCE TIME |
|---|---|---|
| 1-1 | 0.79 | 96 |
| 1-2 | 0.56 | 96 |
| 1-3 | 0.45 | 95 |
| 1-4 | 0.43 | 93 |
| 1-5 | 0.39 | 92 |
| 1-6 | 0.37 | 93 |
| 1-7 | 0.39 | 92 |
| 1-8 | 0.39 | 88 |
| 1-9 | 0.39 | 89 |
| 1-10 | 0.38 | 85 |
| 1-11 | 0.38 | 86 |
| 1-12 | 0.15 | 82 |
| COMPARATIVE EXAMPLE 1-1 | 3.2 | 100 |
| COMPARATIVE EXAMPLE 1-2 | 2.6 | 101 |
| COMPARATIVE EXAMPLE 1-3 | 0.83 | 97 |

As obvious from Table 3, it is realized that the persistence times of the phosphors 1-1 to 1-12 produced according to the liquid phase method became short compared with the phosphor produced according to the solid phase method (Comparative Example 1-1). On the other hand, it is realized that effects with respect to the relative persistence time can be obtained by activating a small amount of alkaline earth metal element or rear earth element to $Zn_2SiO_4$ together with Mn, compared with the Comparative Examples 1-2 and 1-3 produced according to the liquid phase method. Further, in Table 2, the relative luminescence intensity of the Comparative Examples 1-2 and 1-3 was lower than that of the Comparative Example 1-1, and contribution to the luminescence intensity by co-activating Mg could be seen. However, since there is little difference among the Comparative Examples 1-1 to 1-3, it is realized that the persistence time can be made short since a phosphor of particles having high purity can be obtained by producing a zinc silicate system phosphor according to the liquid phase method.

Example 2

In Example 2, a blue emitting phosphor and a red emitting phosphor were produced by the following methods, and PDPs comprising phosphor layers including the phosphors 1-1 to 1-12 produced in the Example 1 and the blue and red emitting phosphors were produced. Then, the white brightness was evaluated.

At first, the methods for producing the blue emitting phosphor and the red emitting phosphor will be explained.

1. Production of Phosphors (1) Production of Red Emitting Phosphor [$(Y,Gd)BO_3:Eu^{3+}$]

A red emitting phosphor precursor was formed under existence of protective colloid according to a reactive crystallization method.

At first, liquid A was prepared by dissolving gelatin (mean molecular weight of approximately 15,000) in 300 ml pure water so that its concentration would become 5 wt %.

Further, liquid B was prepared by dissolving 28.99 g of yttrium nitrate hexahydrate, 15.77 g of gadolinium nitrate and 2.60 g of europium nitrate hexahydrate in pure water so as to be 150 ml.

Furthermore, liquid C was prepared by dissolving 7.20 g of boric acid in pure water so as to be 150 ml.

Next, the liquid A was charged in a reactor, and the reactor was kept at 60° C. Then, agitation was performed by using an agitator. In that state, the liquid B and the liquid C similarly kept at 60° C. were added from the nozzle in the lower portion of the reactor, in which the liquid A was charged, at a constant rate of 60 ml/min. After addition, aging was performed for 10 minutes and a red emitting precursor was obtained. Thereafter, the red emitting precursor was filtrated and dried (105° C., 16 hours), and a dried red emitting phosphor precursor was obtained.

Moreover, the dried red emitting phosphor precursor was calcined for 2 hours under 1200° C. oxidization condition, and a red emitting phosphor having a mean particle size of 0.45 μm was obtained.

(2) Production of Blue Emitting Phosphor ($BaMgAl_{10}O_{17}:Eu^{2+}$)

Similarly to the above-described (1), liquid A was prepared by dissolving gelatin (mean molecular weight of approximately 15,000) in 300 ml of pure water so that its concentration would become 5 wt %.

Further, liquid B was prepared by dissolving 4.70 g of barium nitrate, 0.89 g of europium nitrate hexahydrate and 5.13 g of magnesium nitrate hexahydrate in 295.22 ml of pure water.

Furthermore, liquid C was prepared by dissolving 75.03 g of aluminum nitrate nonahydrate in 268.74 ml of pure water.

A blue emitting phosphor precursor was formed by using the liquid A, the liquid B and the liquid C as prepared as above according to the reactive crystallization method as the same method as shown in the above-described 1-(1). Then, calcining arid the like were performed, and a blue emitting phosphor having a mean particle size of 0.52 μm was obtained.

2. Preparation of Paste

Phosphor pastes were prepared by using the phosphors 1-1 to 1-12 produced in the Example 1, the red emitting phosphor and the blue emitting phosphor produced in the above-described No. 1, respectively. In preparation, ethyl cellulose, polyoxyethylene alkylether, and 1:1 mixed liquor of terpineol and pentanediol were added so that the concentration of solid content of each phosphor would become 40 wt %. The obtained mixtures were made to be phosphor pastes 1-1 to 1-12, the red emitting phosphor paste and the blue emitting phosphor paste that are for applying into the cells of the later-described PDPs, respectively.

3. Production of PDP (1) Production of PDP 2-1

A PDP shown in FIG. 1 was produced as follows by using the phosphor paste 1-1 prepared in the above, red emitting phosphor paste and blue emitting phosphor paste.

At first, transparent electrodes as transparent electrodes 11a were arranged on a glass substrate which would become a front plate 10. Next, bus electrodes 11b were formed on the transparent electrodes 11a by sputtering Cr—Cu—Cr and performing photo etching so as to make display electrodes 11. Then, a low-melting glass was printed on the front plate 10 so as to cover the display electrodes 11, and this was calcined at between 500° C. and 600° C. to form a dielectric layer 12. Furthermore, electron beam evaporation of MgO was performed to form a protective film 13 on the dielectric layer 12.

On the other hand, an Ag thick film was printed on a back plate 20, and this was calcined to form address electrodes 21. Then, partition walls 30 were formed on the back plate 20 and both sides of the address electrodes 21. The partition walls 20 can be formed by printing a low-melting glass in pitch of 0.2 mm and calcining. Furthermore, the above-described phosphor paste 1-1, red emitting phosphor paste and blue emitting phosphor paste were applied on or filled in the bottom face 31a and the side faces 30a of discharge cells 31 (on the address electrodes 21) sectioned by the partition walls 30. At that time, one color of phosphor paste was used per one discharge cell 31. Thereafter, each phosphor paste was dried or calcined, and the organic constituents in each paste were removed. Thereby, phosphor layers 35R, 35G and 35B having different luminous colors, respectively, were formed in the discharge cells 31R, 31G and 31B.

Then, the front plate 10 and the back plate 20, on which the electrodes 11 and 21 and the like were arranged, were aligned so that each electrode arranged face would be faced to each other. Then, its periphery was encapsulated by a seal glass (not shown) in a state of keeping a gap of approximately 1 mm. Then, a gas in which Xenon (Xe) for generating ultraviolet rays by discharging was mixed with Neon (Ne) as a main discharge gas was charged between the substrates 10 and 20, and this was sealed up tightly. Thereafter, aging was performed. Thus, a PDP was produced, and this was made to be PDP 2-1.

(2) Production of PDP 2-2

A PDP 2-2 was produced in the same manner as the PDP 2-1 in the above-described (1) except that the phosphor paste 1-2 prepared in the above-described No. 2 was used instead of the phosphor paste 1-1 in the above-described (1).

(3) Production of PDP 2-3

A PDP 2-3 was produced in the same manner as the PDP 2-1 in the above-described (1) except that the phosphor paste 1-3 prepared in the above-described No. 2 was used instead of the phosphor paste 1-1 in the above-described (1).

(4) Production of PDP 2-4

A PDP 2-4 was produced in the same manner as the PDP 2-1 in the above-described (1) except that the phosphor paste 1-4 prepared in the above-described No. 2 was used instead of the phosphor paste 1-1 in the above-described (1).

(5) Production of PDP 2-5

A PDP 2-5 was produced in the same manner as the PDP 2-1 in the above-described (1) except that the phosphor paste 1-5 prepared in the above-described No. 2 was used instead of the phosphor paste 1-1 in the above-described (1).

(6) Production of PDP 2-6

A PDP 2-6 was produced in the same manner as the PDP 2-1 in the above-described (1) except that the phosphor paste 1-6 prepared in the above-described No. 2 was used instead of the phosphor paste 1-1 in the above-described (1).

(7) Production of PDP 2-7

A PDP 2-7 was produced in the same manner as the PDP 2-1 in the above-described (1) except that the phosphor paste 1-7 prepared in the above-described No. 2 was used instead of the phosphor paste 1-1 in the above-described (1).

(8) Production of PDP 2-8

A PDP 2-8 was produced in the same manner as the PDP 2-1 in the above-described (1) except that the phosphor paste 1-8 prepared in the above-described No. 2 was used instead of the phosphor paste 1-1 in the above-described (1).

(9) Production of PDP 2-9

A PDP 2-9 was produced in the same manner as the PDP 2-1 in the above-described (1) except that the phosphor paste 1-9 prepared in the above-described No. 2 was used instead of the phosphor paste 1-1 in the above-described (1).

(10) Production of PDP 2-10

A PDP 2-10 was produced in the same manner as the PDP 2-1 in the above-described (1) except that the phosphor paste 1-10 prepared in the above-described No. 2 was used instead of the phosphor paste 1-1 in the above-described (1).

(11) Production of PDP 2-11

A PDP 2-11 was produced in the same manner as the PDP 2-1 in the above-described (1) except that the phosphor paste 1-11 prepared in the above-described No. 2 was used instead of the phosphor paste 1-1 in the above-described (1).

(12) Production of PDP 2-12

A PDP 2-12 was produced in the same manner as the PDP 2-1 in the above-described (1) except that the phosphor paste 1-12 prepared in the above-described No. 2 was used instead of the phosphor paste 1-1 in the above-described (1).

Comparative Example 2

1. Production of PDP (1) Production of Comparative Example 2-1

A PDP was produced in the same manner as No. 3 of the Example 2 except that the phosphor of the Comparative Example 1-1 produced in the Comparative Example 1 was used to prepare a phosphor paste in the same manner as No. 2 of the Example 2, and that this phosphor paste was used instead of the phosphor paste 1-1. The produced PDP was made to be Comparative Example 2-1.

(2) Production of Comparative Example 2-2

A PDP was produced in the same manner as No. 3 of the Example 2 except that the phosphor of the Comparative Example 1-2 produced in the Comparative Example 1 was used to prepare a phosphor paste in the same manner as No. 2 of the Example 2, and that this phosphor paste was used instead of the phosphor paste 1-1. The produced PDP was made to be Comparative Example 2-2.

(3) Production of Comparative Example 2-3

A PDP was produced in the same manner as No. 3 of the Example 2 except that the phosphor of the Comparative Example 1-3 produced in the Comparative Example 1 was used to prepare a phosphor paste in the same manner as No. 2 of the Example 2, and that this phosphor paste was used instead of the phosphor paste 1-1. The produced PDP was made to be Comparative Example 2-3.

[Evaluation 2]

With respect to the PDPs 2-1 to 2-12 and the PDPs of the Comparative Examples 2-1 to 2-3 produced in the above, the white brightness when equal sustaining voltage (alternating voltage of 170 V) was applied to the electrodes was measured. Then, each white brightness as relative value of each PDP when the white brightness of the Comparative Example 2-1 was used as 100 was calculated. The brightness of each PDP was evaluated according to these relative values. The results are shown in Table 4.

TABLE 4

| PDP | RELATIVE WHITE BRIGHTNESS |
|---|---|
| 2-1 | 103 |
| 2-2 | 104 |
| 2-3 | 105 |
| 2-4 | 107 |
| 2-5 | 108 |
| 2-6 | 110 |
| 2-7 | 113 |
| 2-8 | 112 |
| 2-9 | 111 |
| 2-10 | 113 |
| 2-11 | 116 |
| 2-12 | 121 |
| COMPARATIVE EXAMPLE 2-1 | 100 |
| COMPARATIVE EXAMPLE 2-2 | 89 |
| COMPARATIVE EXAMPLE 2-3 | 93 |

As shown in Table 4, comparing the Comparative Examples 2-2 and 2-3 with the PDPs 2-1 to 2-13, extremely high relative white brightness compared with the Comparative Examples 2-2 and 2-3 can be obtained by forming a green emitting phosphor layer 35G by using the phosphors 1-1 to 1-12 in which a small amount of alkaline earth metal element or rear earth element is activated to $Zn_2SiO_4$ together with Mn. Furthermore, it is realized that the white brightness improves compared with the Comparative Example 2-1 by producing a precursor of a phosphor according to the liquid phase method.

In the above, the Examples of the present invention are explained. However, it is needless to say that the present invention is not limited to such Examples, but various modifications are possible in a range within the scope of the present invention.

According to the method for producing a phosphor of the present invention, a zinc silicate system phosphor activating a small amount of an alkaline earth metal element or rear earth element together with manganese and having a mean particle size of 0.01 to 1.0 μm can be obtained. Further, a phosphor having high purity and uniform composition can be obtained by producing a precursor of a zinc silicate system phosphor according to a liquid phase synthetic method.

Furthermore, as described above, the phosphor obtained by the method for producing a phosphor according to the present invention can improve the luminescence intensity and can make the persistence time short. Therefore, when this phosphor is used for a display device such as plasma display panel or the like, the brightness of the panel can be improved, and moreover, a moving image or the like can be displayed smoothly.

The entire disclosure of Japanese Patent Applications Nos. 2002-250453 and 2003-077862 filed on Aug. 29, 2002, and Mar. 20, 2003, including specification, claims, drawings and summary are incorporated herein by reference in its entirety.

What is claimed is:

1. A zinc silicate system phosphor comprising:
   manganese activated in the phosphor; and
   at least one kind of element selected from rear earth elements and alkaline earth metal elements, the element being activated in the phosphor,
   wherein a mean particle size of the phosphor is between 0.01 and 1.0 μm.

2. The phosphor of claim 1, wherein the phosphor is represented by the following formula (1):

$$Zn_\alpha SiO_4:Mn_x, M1_y, M2_z \qquad (1)$$

wherein in the formula (1), the M1 and the M2 are a rear earth element or an alkaline earth metal element, respectively, and each range of the α, x, y and z is $1.4 \leq \alpha < 2.0$, $0 < x \leq 0.3$, $0 < y \leq 0.2$ and $0 \leq z \leq 0.2$.

3. The phosphor of claim 2, wherein the M1 is barium and the M2 is magnesium.

4. A phosphor paste comprising:
   the phosphor of claim 3 dispersed in a mixture including a binder and an organic solvent.

5. A display device comprising:
   a phosphor layer formed by applying or filling the phosphor paste of claim 4.

6. A display device comprising:
   a phosphor layer containing the phosphor of claim 3.

7. A plasma display panel comprising:
   two substrates arranged so as to face to each other by keeping a predetermined distance;
   partition walls for sectioning a space between the substrates in plurality, the partition walls being provided between the substrates; and
   a discharge cell formed by being surrounded with the partition walls and the substrates,
   wherein a phosphor layer including the phosphor of claim 3 is provided in an inner side of the discharge cell.

8. A phosphor paste comprising:
   the phosphor of claim 2 dispersed in a mixture including a binder and an organic solvent.

9. A display device comprising:
   a phosphor layer formed by applying or filling the phosphor paste of claim 8.

10. A plasma display panel comprising:
    two substrates arranged so as to face to each other by keeping a predetermined distance;
    partition walls for sectioning a space between the substrates in plurality, the partition walls being provided between the substrates; and
    a discharge cell formed by being surrounded with the partition walls and the substrates,
    wherein a phosphor layer formed by applying or filling the phosphor paste of claim 8 is provided in an inner side of the discharge cell.

11. A display device comprising:
    a phosphor layer containing the phosphor of claim 2.

12. A plasma display panel comprising:
    two substrates arranged so as to face to each other by keeping a predetermined distance;
    partition walls for sectioning a space between the substrates in plurality, the partition walls being provided between the substrates; and
    a discharge cell formed by being surrounded with the partition walls and the substrates,
    wherein a phosphor layer including the phosphor of claim 2 is provided in an inner side of the discharge cell.

13. A phosphor paste comprising:
    the phosphor of claim 1 dispersed in a mixture including a binder and an organic solvent.

14. A display device comprising:
    a phosphor layer formed by applying or filling the phosphor paste of claim 13.

15. A plasma display panel comprising:
    two substrates arranged so as to face to each other by keeping a predetermined distance;

partition walls for sectioning a space between the substrates in plurality, the partition walls being provided between the substrates; and a discharge cell formed by being surrounded with the partition walls and the substrates, wherein a phosphor layer formed by applying or filling the phosphor paste of claim 13 is provided in an inner side of the discharge cell.

16. A display device comprising:

a phosphor layer containing the phosphor of claim 1.

17. A plasma display panel comprising:

two substrates arranged so as to face to each other by keeping a predetermined distance;

partition walls for sectioning a space between the substrates in plurality, the partition walls being provided between the substrates; and a discharge cell formed by being surrounded with the partition walls and the substrates, wherein a phosphor layer including the phosphor of claim 1 is provided in an inner side of the discharge cell.

* * * * *